United States Patent [19]

Kuraseko

[11] Patent Number: 4,979,786
[45] Date of Patent: Dec. 25, 1990

[54] ANTI-VIBRATION LEG UNIT

[75] Inventor: Takao Kuraseko, Ohtsu, Japan

[73] Assignee: Sanyo Electric Co., Ltd., Osaka, Japan

[21] Appl. No.: 348,558

[22] Filed: May 8, 1989

[30] Foreign Application Priority Data

Jun. 10, 1988 [JP] Japan .................................. 63-144034
Sep. 6, 1988 [JP] Japan .................................. 63-222632

[51] Int. Cl.⁵ ............................................. A47B 91/00
[52] U.S. Cl. .................................. 312/256; 248/188.9
[58] Field of Search .................. 248/188.8, 188.9, 677; 312/256

[56] References Cited

U.S. PATENT DOCUMENTS

| | | | |
|---|---|---|---|
| 870,770 | 11/1907 | Fuller | 248/188.9 |
| 1,767,194 | 6/1930 | Vollmer | 248/188.8 |
| 2,673,352 | 3/1954 | Risch | 248/188.8 |
| 3,869,105 | 3/1975 | Daniels | 248/188.8 |

*Primary Examiner*—Joseph Falk
*Attorney, Agent, or Firm*—Darby & Darby

[57] ABSTRACT

An anti-vibration leg unit used for supporting the body of an electric machine such as a washing machine which comprises a fixed leg attached to an electric machine body, and an elastic leg made of elastic material and assembled to the fixed leg. It is useful for preventing the transfer of the vibration and noise of the electric machine to the floor.

11 Claims, 5 Drawing Sheets

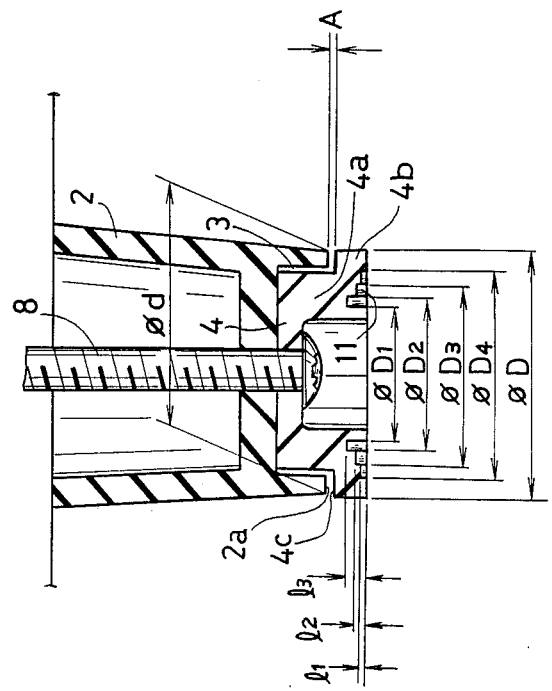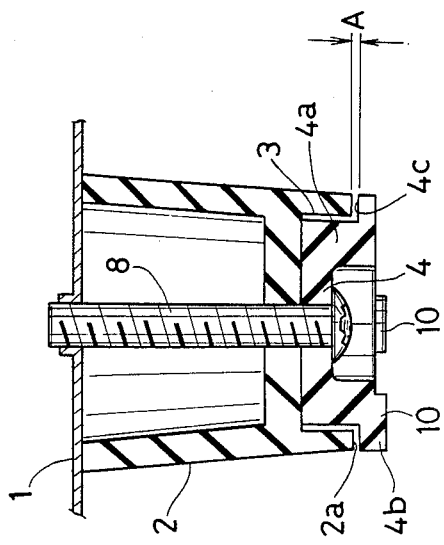

ANTI-VIBRATION LEG UNIT

BACKGROUND OF THE INVENTION

1. Field of the Invention

This invention relates to a leg unit used for support of the body of an electric machine such as a washing machine and, more particularly, to an anti-vibration leg unit which comprises a fixed leg attached to an electric machine body and an elastic leg made of elastic material and assembled to the fixed leg.

2. Description of the Prior Art

A conventional anti-vibration leg unit is disclosed in Japanese Published Unexamined patent application Ser. No. 140866/1978.

This conventional leg unit, as shown in FIG. 11, comprises a fixed leg 52 attached to the bottom of an electric machine body 51 of such an electric machine as a washing machine and an elastic leg 53 assembled to the fixed leg 52. The leg unit has as one of its features a contact surface of the fixed leg 52 with the elastic leg 53, and the fixed leg has a convex portion 54 and a concave portion 55. These convex portion 54 and concave portion 55 define an always contacting portion and another portion which is put into contact when a heavy load is imposed, respectively.

That is, under a light load, for example, while the washing machine is dewatering, the vibration and noise of the machine body 51 are prevented from being trasferred to the floor by virtue of a membranous vibration of a portion of the elastic leg 53 between the outer diameter d of the convex portion 54 of the fixed leg 52 and the inner diameter D of a floor-contacting portion of the elastic leg 53.

Under a heavy load, however, while the washing machine is washing, the elastic leg 53 deflects as illustrated by the dotted lines (see FIG. 11) to come into contact with the concave portion 55 of the fixed leg 52, so that a certain strength is preserved and maintained.

According to the foregoing conventional leg unit, the stiffness of the elastic leg 53 must be enhanced to prevent the collapse of the elastic leg 53 that would occur when a heavy load is imposed; on the other hand, in order to exert sufficient vibration-proof effect, the elastic leg 53 must be made as soft as possible; therefore it is difficult to find a "happy medium" and make an adjustment between these two requirements.

In order to solve the above problem, a vibration-proof leg unit has proposed wherein a flange is disposed on an undersurface of an elastic leg to prevent collapse of the elastic leg caused by heavy load (Japanese Published Examined patent application Ser. No. 36786/1973).

As shown in FIGS. 12 and 13, this leg unit comprises a metal leg 62 attached to a bottom of an outer frame 61 of a drum-type washing machine and a rubber leg 63 which has a flange 63a at its under edge and supports the metal leg 62, and the rubber leg 63 is combined with the metal leg 62 with a threaded shaft 64 and the height of the metal leg 62 can be adjusted by operating a lock nut 65.

However, when the above leg unit is used in a manner such as shown in FIG. 12 (when the floor is relatively rigid) or FIG. 13 (when the floor is relatively flexible), in any case it is difficult to prevent the outer frame 61 from vibration, because the undersurface of the flange 63a of the rubber leg 63 is in contact with the floor surface, and the contact area between the flange and the floor is larger, the vibration-absorbing ability of the rubber leg 63 decreases, in particular under a light load, for example in dewatering wherein the dewatering tub along with the washing rotate at a higher speed.

SUMMARY OF THE INVENTION

The present invention resides in an anti-vibration leg unit which is composed of a fixed leg attached to a bottom portion of an electric machine body, and an elastic leg assembled to the the fixed leg has a concave portion whose opening faces downward, and the elastic leg is made of a material having the impact resilience coefficient of about 20% or less and has a main portion abutted on the bottom surface of the concave portion of the fixed leg and a flange portion integrally extending downward and outward from the main portion down to the floor surface which flange portion supports the circumferential surface of the opening of the concave portion of the fixed leg at least when a heavy load is added to the electric machine body, thereby preventing the fixed leg from directly contacting the floor surface, and further the flange portion has in the undersurface a concave or convex portion collapsible or being able to give under the strain when the electric machine body is under a heavy load.

That is, the present invention is characterized by the fact that the elastic leg resiliently supports the electric machine body on the floor surface via the fixed leg having the concave portion whose opening faces downward; and has the main portion abutted on the bottom surface of the concave portion of the fixed leg and the flange portion integrally extending downward and outward from the main portion down to the floor surface, and the flange portion having in its undersurface a concave or convex portion.

Thus, for example, in a washing machine, when a light load is imposed, that is, in the case of dewatering wherein a load is about 40 kg and a dewatering tub along with the washing rotates at a high speed of about 900 r.p.m., the present anti-vibration leg unit has the following advantages.

Namely, the fixed leg only repeats a movement of pressing the elastic leg and thus the latter can directly come into contact with the floor surface through the above-mentioned at a concave or convex portion to be able to decrease the contact area between the elastic leg and the floor in comparison with a flange portion without a concave or convex portion. Thus the spring constant of the elastic leg can be decreased than that of the elastic leg with a flat under-surface, and the transfer of the vibration of the washing machine body in dewatering operation to the floor can be reduced.

Further, because the elastic leg is made of a material with an impact resilience coefficient of about 20% or less, when the elastic leg is repeatedly pressed with the fixed leg, the main portion of the elastic leg expands and contracts to exhibit a good cushion effect and the elastic leg can be much improved its vibration absorbing ability.

In addtion, for example in a washing machine when a heavy load is imposed in washing operation, the present anti-viblation leg unit has also the following advantages.

Namely, when the circumferential surface of the opening of the fixed leg, repeatedly compresses the elastic leg, the concave or convex portion under the undersurface of the flange portion of the elastic leg collapses, so that the contact area in undersurface of the elastic leg between the elastic leg and the floor surface increases and also the elastic leg can withstand the great forces to be caused by heavy load. Further, even if the main portion of the elastic leg is longitudinally compressed with a heavy load, the circumferential surface of the opening of the fixed leg can be received on the upper surface of the flange portion of the elastic leg, thereby the fixed leg can be prevented its direct contact with the floor surface, and because the vibration of the washing machine body under a heavy load is much smaller than that under a light load, such vibration can be sufficiently absorbed by the compressed main portion of the elastic leg.

BRIEF DESCRIPTION OF THE DRAWINGS

FIG. 4 is a sectional view taken along line IV-O-IV in FIG. 3;

FIG. 5 corresponds to FIG. 4, showing the state when a heavy load is imposed;

FIG. 6 is a vertical sectional view of a third embodiment;

DETAILED DESCRIPTION OF THE PREFERRED EMBODIMENTS

Figure 1:
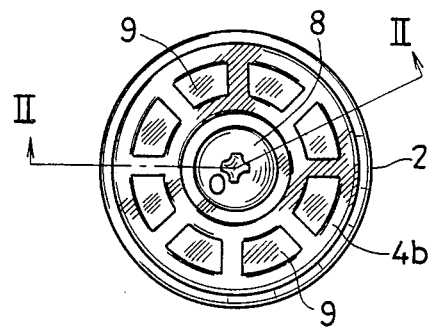
FIG. 1 is a bottom view of a first embodiment of an anti-vibration leg unit according to the present invention.

In the present invention, an anti-vibration leg unit is used as a support for an electric machine body, which is attached to a bottom portion of the electric machine body to prevent the transfer of vibration and noise to the floor.

The anti-vibration leg unit of the present invention is generally and preferably used in a manner that a plurality of anti-vibration leg units are attached to the undersurface of the bottom portion of the electric machine body in combination with a height adjustable leg.

The electric machine body can be a washing machine body, a dishwasher body, etc.

The structural features of the anti-vibration leg unit of the present invention are such that a fixed leg attached to the bottom surface of the electric machine body has a concave portion whose opening faces downward, to which an elastic leg is assembled. The elastic leg has a main portion abutted on the bottom surface of the concave portion of the fixed leg which main portion expands and contracts in compliance with the vibration of the electric machine body at the time of a light load to buffer any vibration, and a flange portion integrally extending downward and outward from the main portion which flange portion supports the circumferential surface of the opening of the concave portion of the fixed leg even if the electric machine body sinks due to a heavy load, and a concave or convex portion which is formed on the undersurface of the flange portion, and compressed and collasped when a heavy load is imposed to the machine.

The main portion of the elastic leg may be of any shape; but, it should be such that the main portion can be inserted in and attached to the cancave portion of the fixed leg. For example, a cap shape, a columnar shape and a cylindrical shape are preferable if they allow attachment to the concave portion of circular shape in horizontal cross-section with leaving a portion projecting from the circumferential surface of the opening of the concave portion.

A concave or convex portion formed on the undersurface of the elastic leg in the present invention is as follows:

(i) A plurality of concave portion circularly formed on the undersurface of the elastic leg and facing downward;

(ii) A plurality of convex portion circularly formed on the undersurface of the elastic leg and facing upward;

(iii) Annular concave portion being shaped so that its individual ring portions progressively sink from outer to inner in a stepped fashion, and (iv) Annular convex part being shaped so that its individual ring portions progressively protrude from inner to outer in a stepped fashion.

In any case, it is preferred that the contact area in the flange portion of the elastic leg between the elastic leg and the floor surface is larger when a heavy load is imposed in comparsion with that in the case that a light load is imposed.

Further, the elastic leg is made of an elastic material capable of absorbing vibration. In the present application, it is preferable to use a soft(or flexible) rubber material, such as isobutylene-isoprene rubber or polynorbornane rubber, for the elastic leg.

That is, the impact resilience coefficient of the flexible rubber material should be no larger than about 20%, or preferably be of the order of about 10%. It was found that when applied to, for example, a washing machine body, such a material can absorb the vibration inherent in a washing machine body particularly during both light loads or heavy loads.

In the present invention, the impact resilience coefficient was measured through an impact resilience test.

A special machine for testing pieces, such as isobutylene-isoprene rubber, comprises an iron rod of 350 g in weight, about 356 mm in length and 12.7 mm in diameter hung horizontally with four fishing lines, a support member for supporting a test piece, and a circular scale plate attached to the support member.

The scale plate has a horizontal length of 625 mm, the radius of a circle is 2000 mm, and the graduation is defined by dividing the vertical height (100 mm) equally into 100 parts.

The end of the iron rod which impacts on the test piece is semi-circular in shape with a diameter of 12.7 mm, the other end acts as a pointer; the height of suspension of the iron rod is set to 2000 mm, and the height through which the iron rod falls is set to 100 mm on the vertical scale. An adjustment must be made so that when the iron rod is suspended freely, the pointer indicates a position of graduation 0 (zero) on the scale and the impacting end of the iron rod just touches the surface of a test piece.

Further, the support member must be rigidly secured so as not to cause vibration even if a blow is given by the iron rod.

A test process will now be described.

First, set the pointer of the iron rod to the position of graduation 0 on the scale plate. Then, the iron rod is allowed to fall freely, and as the iron bar is repulsed, the height as indicated by the pointer is read.

Repeat the foregoing operation four times taking the repulsion height readings occurring after each blow, and take an average to obtain the impact resilience coefficient (%).

Normally, the foregoing test is performed with three test pieces of the same material, and the results of the test are averaged to obtain the impact resilience coefficeint (%) of these test pieces.

The test record must include (1) the impact resilience coefficient (%), (2) the temperature of the test, and (3) several other parameters which do not require description here.

In the present invention, the thickness of the flange portion is preferably 3 to 8 mm, and the gap between the circumferential surface of the opening of the fixed leg and the upper surface of the flange portion when a light load is imposed is preferably 0.5 to 2.0 mm.

In the present invention, a heavy load is defined as the state in which washing and/or water is held in the washing machine body, or kitchen dishes are stacked and held in the dishwasher body, and so on.

For example, in the case of a washing machine, the heavy load typically means the state wherein a washing machine of about 30 kg in weight contains the washing of about 5 kg and water of about 50 l, i.e. that of total weight of about 85 kg. When the washing machine is operated under such heavy load(washing operation), only washing, water and the rotary blade in the washing tub rotates but the tub but itself does not rotate. Consequently the resulting vibration is relatively small.

On the other hand, the light load means the state wherein a washing machine contains the washing and small amount of water, i.e. that of total weight of about 40 kg. When the washing machine is operated under such light load (dewatering operation), the dewatering tub containing the washing and water rotates at higher speed such as about 900 r.p.m. Consequently, considerably large vibration generates.

Figure 2:
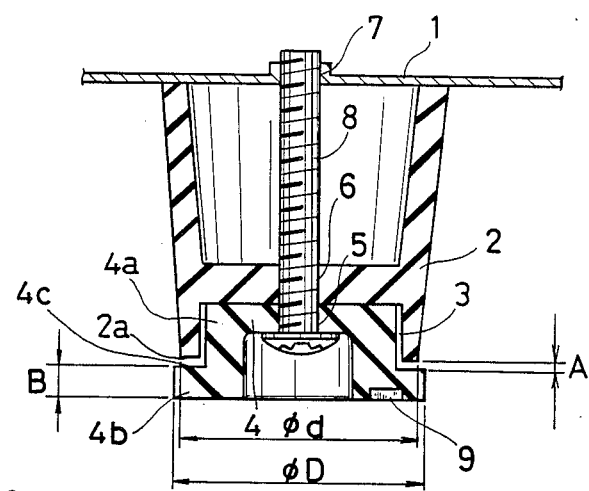
FIG. 2 is a sectional view taken along line II-O-II in FIG. 1.

In FIGS. 1 and 2, reference numeral 1 designates a bottom portion of the body of an electric machine, such as a washing machine or a dishwasher, 2 designates a cylindrical fixed leg secured to or formed integrally with the bottom potion 1 at a given position and 3 designates a downward-facing concave poriton undersurface of the fixed leg 2, with the undermost surface of the fixed leg 2 defining the circumferential surface 2a of an opening. 4 designates an elastic leg made of a flexible rubber material having an impact resilience coefficient of aobut 10%, such as polynorbornane rubber or IIR (isobutylene-isoprene rubber), which is loosely fitted into the concave portion 3, and has a cylindrical main portion 4a longer than the depth of the concave portion 3 and a flange portin 4b projecting outward from the lower edge of the main portion 4a and having a diameter D larger than the diameter d of the concave portion 3, both portions being formed integrally together.

As is common knowledge, polynorbornane rubber or IIR has a small impact resilience coefficient of about 10% which corresponds from one-fifth to one-tenth that of NR (natural rubber) which has an impact resilience coefficient of about 80% or SBR (styrene-butadiene rubber) having an impact resilience coefficient of about 40%, the latter two being widely used hitherto, so that the former two are excellent in terms of their capability to absorb vibration of impact.

The bottom portion 1, concave portion 3 of the fixed leg 2 and elastic leg 4 have screw holes 5, 6 and 7, respectively, aligned on the same axial line, these being tightened together by abutting the fixed leg 2 on the bottom portion 1, loosely fitting the main portion 4a of the elastic leg 4 in the concave portion 3, and inserting a bolt 8 into the screw holes 5, 6 and 7 from below.

Here, the length of the main portion 4a is set so that a gap (A) of about 1.0 mm is left between the circumferential surface 2a of the opening or the undermost surface of the fixed leg 2 and the upper surface 4c of the flange portion 4b, and the thickness B of the flange portion 4b is set to about 5.0 mm. Further, a plurality of downward-facing concave portions 9 are arranged around the portion 4b on the undersurface. Namely, under a light load, the washing machine body is supported with the flange portion 4b in a manner that the area of the undersurface of the flange portion 4b except that of the concave porions 9 is in contact with the floor surface. Accordingly, the contact area between the flange portion 4b and the floor surface is smaller by the total area of the concave portion 9 to increase the cushion effect of the elastic leg 4 and much decrease the transfer of the vibration which generates under the above light load to the floor surface in comparison with an elastic leg without such concave portions.

On the other hand, under a heavy load, the circumferential surface 2a of the opening of the fixed leg 2 is supported by the upper surface 4c of the flange portion 4b, and when the load bearing weight is increased, the concave portions 9 are compressed and partially collapse so that the contact area betweeen the undersurface of the flange portion and the floor surface increases and the fixed leg 2 is supported by the whole undersurface of the flange portion 4b (the elastic leg 4), thereby preventing the transfer of the vibration of a washing/dewatering machine body. Further, although the main portion 4a is compressed in its longitudinal direction, the circumferential surface 2a of the opening of the fixed leg 2 is supported by the upper surface 4c of the flange portion 4b to prevent the fixed leg 2 from directly contacting the floor surface, and the main portion 4a expands in all radial directions to fill up a gap between it and the concave portion 3, thereby ensuring a vibration-proof effect exerted by the elastic leg 4.

Figure 3:
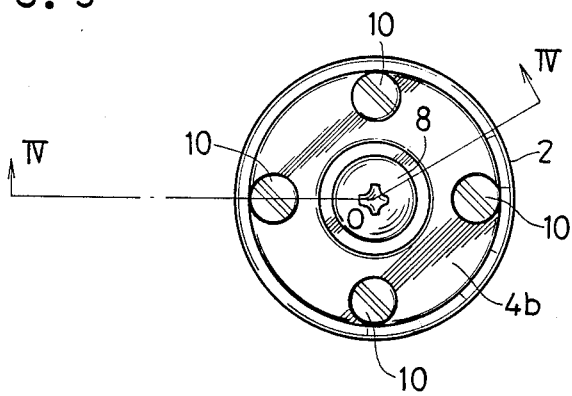
FIG. 3 is a bottom view of a second embodiment.

FIGS. 3 through 5 show a second embodiment which has disc-shaped convex portions 10 formed at angular intervals of 90 degrees on the undersurface of the flange portion 4b.

Therefore, under a light load, the machine body is supported by the individual convex portions 10, whereas under a heavy load, as shown in FIG.5, the convex portions 10 collapse, so that the fixed leg 2 is supported by the whole undersurface of the flange portion 4b (the elastic leg 4) to prevent the transfer of the vibration of the washing/dewatering machine body.

Figure 7:
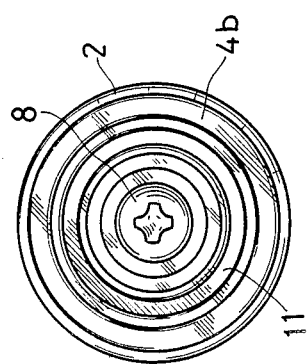
FIG. 7 is a bottom view of the third embodiment.
Figure 8:
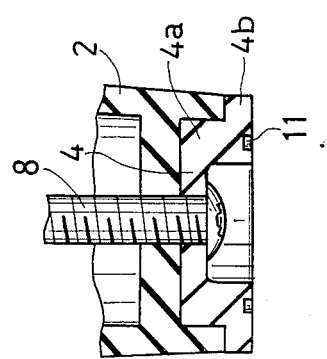
FIG. 8 corresponds to FIG. 6, showing the state when a heavy load is imposed.

FIGS. 6 through 8 show a third embodiment which has an annular concave portion 11 formed in the undersurface of the flange 4b, the annular concave parts being shaped so that its individual ring portions progressively sink from outer to inner in a stepped fashion.

Therefore, as shown in FIG. 8, the concave portion 11 progressively collapses from the outermost ring portion in compliance with the degree of load so that there can be obtained a support state compatible with the degree of load.

As a modification of the third embodiment, a stepped convex portion may be projected from the undersurface of the flange 4b.

It should be noted that in the first through third embodiments, the gap A between the circumferential surface 2a of the opening or the undermost surface of the fixed leg 2 and the upper surface 4c of the flange portion 4b under a light load is not critical.

As described above, in the first through third embodiments, under the conditions of a light load the successful vibration-proof (vibration absorptive) effect occurs through the vertical expansion and contraciton of the elastic leg 4. Of course, the elastic leg 4 must support the fixed leg 2 firmly. But, under a light load, the contact area between the elastic leg and the floor surface is smaller, and this fact means the spring constant of the elastic leg is smaller, so that the transfer of the vibration of the washing machine body(in dewatering operation) to the floor is remarkably decreased. Under a heavy load, the virtual contact area ("footprint") of the elastic leg between the elastic leg 4 and the floor becomes larger; as a result, a strong state of support is obtained without diminishing the vibration-proof effect by virtue of the presence of the flange portion 4b.

Figure 9:
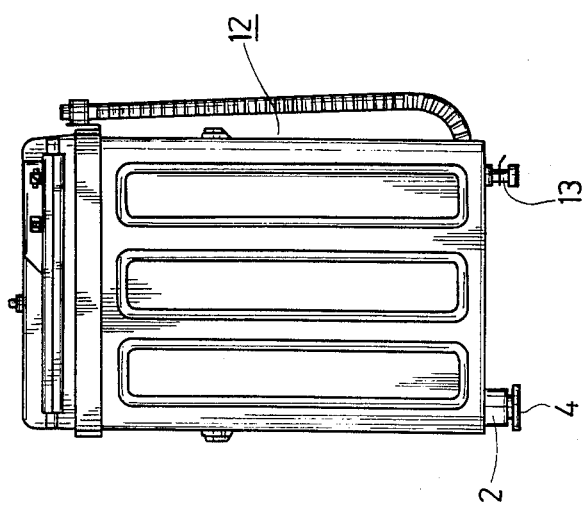
FIG. 9 is a front view of a washing machine.

FIG. 9 shows a washing/dewatering machine body 12 with the leg unit of the first embodiment attached thereto, in which the elastic leg 4 is made of isobutyleneisoprene rubber. The leg unit is attached to three corner positions of the undersurface of the body 12, and a height adjusting leg 13 made of hard rubber is attached to one remaining corner position.

In general, the washing/dewatering machine accommodates a washing/dewatering tub which can rotate at high speed. In case that clothing is held inside the dewatering tub with lopsided distribution, the dewatering tub swings abnormally as it rotates, so that the washing machine body 12 rattles in all direciton.

However, because isobutylene-isoprene rubber was used as the material of the elastic leg 4 with downward-facing concave portions 9 on the undersurface of the flange portion 4a, the capability of vibration absorption was improved by about two times as compared with conventional machine legs of the prior art, as shown in the following table:

|  | Longitudinal a (mm) | Lateral b (mm) | $\sqrt{a^2 + b^2}$ c (mm) | Ratio (%) |
| --- | --- | --- | --- | --- |
| Present embodiment | 0.12 | 0.09 | 0.15 | 100 |
| Prior art | 0.27 | 0.19 | 0.33 | 220 |

Figure 10:
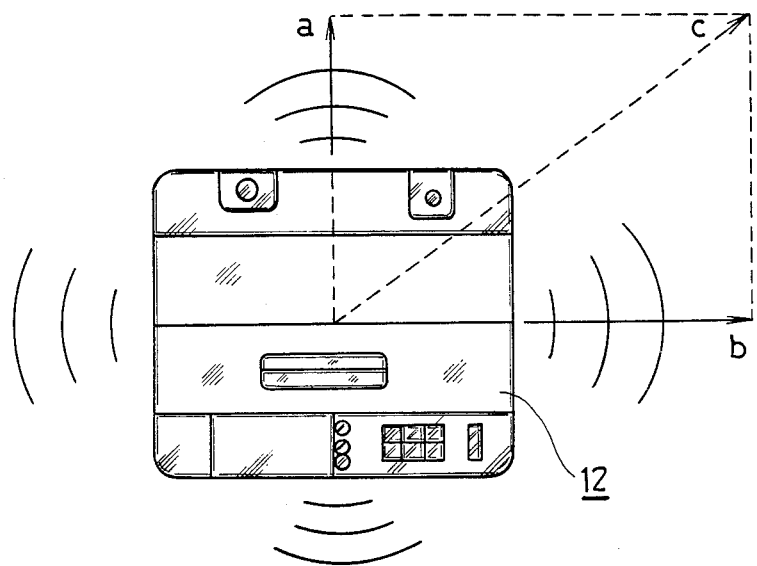
FIG. 10 is a plan view of the washing machine.
Figure 11:
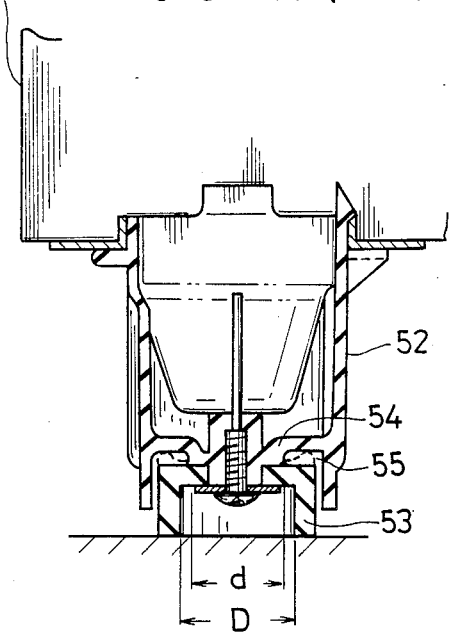
FIG. 11 to 13 are vertical sectional views of a conventional leg units.
Figure 12:
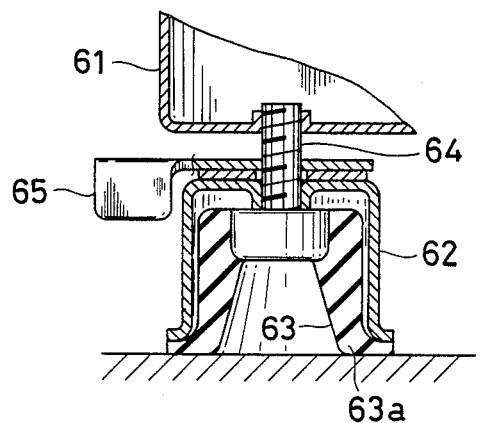
Figure 13:
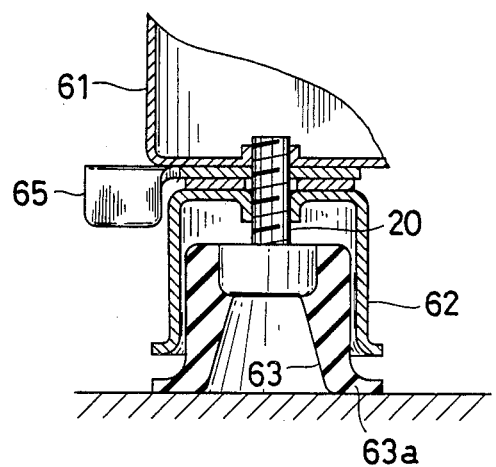

The above experiment was performed under conditions such that 1.5 kg of clothing was dewatered as a lopsided load, resulting in data as illustrated in FIG.10 a(mm) represents the amplitude of rattling in the longitudinal direction of the washing machine body 12, b(mm) the amplitude of rattling in the lateral direction, and c(mm) the value $$(\sqrt{a^2 + b^2})$$

obtained by combining a and b. As the machine leg of the prior art, an elastic leg made of a hard rubber material was used.

As described above, in the anti-vibration leg unit of the present invention, the elastic leg has the flange portion and the concave or convex portion are formed on the under-surface of the flange portion. Accordingly, the concave or convex portion progressively collapses in compliance with the weight of the load and the contact area between the undersurface of the flange portion and the floor surface increases as the weight of the load increases. That is, the vibration-proof degree and the supporting degree can be regulated automatically in compliance with the load imposed and under a light load, sufficient vibration-proof effect is obtained, and also under a heavy load, not only a vibration-proof effect but also a strong supporting state of a washing machine body are obtained.

With the elastic leg for support of the washing machine body being made of a flexible rubber material such as isobutylene-isoprene rubber, the superior vibration-proof effect is exerted at the time of a heavy load, e.g. when a dewatering operation is performed, as well as at the time of a light load, thereby suppressing the rattling of the washing machine body.

What is claimed is:

1. An anti-vibration leg unit for supporting a machine body whose loading changes comprising a fixed leg for attachment to a bottom portion of the machine body, and an elastic leg assembled to said fixed leg for resiliently supporting the machine body on a floor surface via said fixed leg, wherein said fixed leg, whose impact resilience coefficient is greater than that of said elastic leg, has a surrounding wall with a circumferential bottom surface defining a concave portion whose opening faces downward, and said elastic leg is made of a material having an impact resilience coefficient of no larger than about 20% and has its main upper portion engaging the bottom surface of said concave portion of said fixed leg within said fixed leg concave portion under all condition of loading of the body and a flange portion integrally extending downward and outward from said main portion whose undersurface rests on the floor surface, which elastic leg flange portion engages and supports the circumferential bottom surface of said surrounding wall of said concave portion of said fixed leg at least when a heavy load is present in the machine body to prevent said fixed leg from directly contacting the floor surface, and further the flange portion has in its undersurface a concave or convex portion collapsible when a heavy load is imposed on the machine body to increase surface area contact of the flange portion undersurface with the floor surface.

2. An anti-vibration leg unit according to claim 1, wherein there is a gap between the circumferential bottom surface of the surrounding wall and the upper surface of said flange portion of said elastic leg when a light load is present in the machine body.

3. An anti-vibration leg unit according to claim 2, wherein said gap is from 0.5 to 2.0 mm.

4. An anti-vibration leg unit according to claim 1, wherein said concave or convex portion in said undersurface of said flange portion is formed in stepped concentric fashion.

5. An anti-vibration leg unit according to claim 1, wherein said elastic leg has a concave portion whose opening faces downward and is fastened to said fixed leg via its concave portion.

6. An anti-vibration leg unit according to claim 1, wherein said main portion of said elastic leg is shaped so as to be loosely fitted in said concave portion of said fixed leg with a space between the periphery of the main portion of the elastic leg and the inner surface of the surrounding wall of said concave portion and expands to engage the surrounding wall inner surface when a heavy load is imposed on the machine body.

7. An anti-vibration leg unit according to claim 1, which is attached to each of three corner positions of the undersurface of the machine body and used in combination with a height adjusting leg attached to one remaining corner position of the under surface of the machine body.

8. An anti-vibration leg unit according to claim 1, wherein the machine body is a washing machine body.

9. An anti-vibration leg unit according to claim 1, wherein the material of said elastic leg is isobutyleneisoprene rubber or polynorbornance rubber.

10. An anti-vibration leg unit according to claim 1, wherein said concave or convex portion in said undersurface of said flange portion comprises a plurality of recesses, the undersurface of the flange spreading when a heavy load is applied to the machine body.

11. An anti-vibration leg unit according to claim 10, wherein said concave or convex portion in said undersurface of said flange portion comprises a plurality of pads on said flange portion undersurface, said pads collapsing when a heavy load is applied to the machine body.

* * * * *